(12) United States Patent
Benner et al.

(10) Patent No.: US 6,914,235 B2
(45) Date of Patent: Jul. 5, 2005

(54) POSITION MEASURING SYSTEM AND METHOD FOR OPERATING A POSITION MEASURING SYSTEM

(75) Inventors: Ulrich Benner, Trostberg (DE); Wolfgang Holzapfel, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 42 days.

(21) Appl. No.: 10/180,916

(22) Filed: Jun. 26, 2002

(65) Prior Publication Data

US 2003/0016369 A1 Jan. 23, 2003

(30) Foreign Application Priority Data

Jun. 27, 2001 (DE) .......................................... 101 30 938

(51) Int. Cl.⁷ ................................................ G01D 5/34
(52) U.S. Cl. .............................. 250/231.13; 250/559.29
(58) Field of Search ....................... 250/231.13, 559.29, 250/221, 216, 234, 235; 341/11, 13

(56) References Cited

U.S. PATENT DOCUMENTS

| | | | | |
|---|---|---|---|---|
| 3,569,723 | A | * | 3/1971 | Brake et al. ............ 250/231.16 |
| 5,883,298 | A | | 3/1999 | Holzapfel et al. |
| 6,229,140 | B1 | | 5/2001 | Ishizuka |
| 6,429,940 | B1 | | 8/2002 | Willhelm |
| 6,603,114 | B1 | | 8/2003 | Holzapfel et al. |
| 2001/0001358 | A1 | | 5/2001 | Ishizuka |
| 2001/0017349 | A1 | | 8/2001 | Holzapfel et al. |

FOREIGN PATENT DOCUMENTS

| | | |
|---|---|---|
| DE | 37 26 678 C1 | 3/1989 |
| DE | 195 05 176 A1 | 8/1995 |
| DE | 195 05 176 | 9/1995 |
| DE | 196 42 200 A1 | 4/1998 |
| DE | 198 59 670 A1 | 6/2000 |
| DE | 199 08 328 | 8/2000 |
| DE | 199 62 278 A1 | 8/2001 |
| DE | 199 62 278 | 8/2001 |
| EP | 0 555 507 A1 | 8/1993 |
| EP | 0 555 507 | 8/1993 |
| EP | 0 770 850 | 5/1997 |
| EP | 1 081 457 | 3/2001 |
| EP | 1111345 | 6/2001 |
| EP | 1 111 345 A2 | 6/2001 |
| GB | 2 116 313 A | 9/1983 |
| GB | 2 116 313 | 9/1983 |

\* cited by examiner

*Primary Examiner*—Que T. Le
(74) *Attorney, Agent, or Firm*—Brinks Hofer Gilson & Lione (57) ABSTRACT

A position measuring system that includes a scale having a first track with successive partial areas of differing reflectivity and a second track with successive partial areas of differing reflectivity. A scanning unit which moves relative to the scale in a measuring direction so that a first position dependent scanning signal and a second position dependent scanning signal are generated by scanning the first track and the second track by the scanning unit. The first position dependent scanning signal and the second position dependent scanning signals have a different pitch behavior in case of a pitch tilt of either the scanning unit or the scale to the effect, that in that case the first position dependent scanning signal indicates an erroneous position, while the second position dependent scanning signal continues to show a correct position. The scanning unit has a structure such that a third position dependent scanning signal is generated from the first track and has a different pitch behavior than the first position measuring scanning signal generated from the first track.

20 Claims, 6 Drawing Sheets

POSITION MEASURING SYSTEM AND METHOD FOR OPERATING A POSITION MEASURING SYSTEM

Applicants claim, under 35 U.S.C. § 119, the benefit of priority of the filing date of Jun. 27, 2001 of a German patent application, copy attached, Serial Number 101 30 938.4, filed on the aforementioned date, the entire contents of which is incorporated herein by reference.

BACKGROUND OF THE INVENTION

1. Field of the Invention

The present invention relates to a position measuring system which is particularly suitable for determining the absolute position of two objects which can be moved with respect to each other. The present invention furthermore relates to a method for operating a position measuring system.

2. Discussion of Related Art

A category of known position measuring systems for determining absolute positions includes an incremental track extending in the measuring position, as well as an absolute track arranged parallel to it, on the scanned scale, and has a serial absolute coding, for example. A correspondingly constructed position measuring system is described in DE 195 05 176 A1, for example. For an exact position determination it is necessary to synchronize the resulting position-dependent scanning signals from the two tracks with each other. This is critical in particular when these signals clearly differ in the order of magnitude of the respective local resolution. Additional problems result when scale tapes are used on the scale, since their parallel alignment with the measuring direction is sometimes not always optimally possible. Measurement errors result if, for example, a twisting of the scale occurs around an axis, which is oriented perpendicularly in relation to the scale surface.

To solve these problems it was therefore proposed in German Patent Application 199 62 278.7 of Applicant to generate at least two incremental signals of different resolution from the scanning of a suitable incremental track. Besides the appropriate design of the scanned incremental track, an appropriate design of the respective detector arrangements in the scanning unit is also required for this. Two suitable detector variations are proposed for this purpose by the above mentioned patent application, by which the discussed problem, which arises in the course of possible twisting of the scanning unit, or of the scale, around an axis which is oriented perpendicularly in relation to the scale surface, can be solved.

Besides undesirable twisting around this axis, in the course of measuring operations pitch movements of the scanning unit or of the scale can occur around axes, which are oriented in the scale plane, or parallel with the scale plane, and perpendicularly in relation to the measurement direction. Such pitch movements can also result in errors during the synchronization of scanning signals with different local resolutions, in particular if the scanning signals from different tracks show a different pitch behavior.

OBJECT AND SUMMARY OF THE INVENTION

It is therefore an object of the present invention to disclose a position measuring system which always assures a dependable position determination. Furthermore, it is intended to disclose a method for operating such a position measuring system.

This object is attained by a position measuring system that includes a scale having a first track with successive partial areas of differing reflectivity and a second track with successive partial areas of differing reflectivity. A scanning unit which moves relative to the scale in a measuring direction so that a first position dependent scanning signal and a second position dependent scanning signal are generated by scanning the first track and the second track by the scanning unit. The first position dependent scanning signal and the second position dependent scanning signals have a different pitch behavior in case of a pitch tilt of either the scanning unit or the scale to the effect, that in that case the first position dependent scanning signal indicates an erroneous position, while the second position dependent scanning signal continues to show a correct position. The scanning unit has a structure such that a third position dependent scanning signal is generated from the first track and has a different pitch behavior than the first position measuring scanning signal generated from the first track.

This object is furthermore attained by a method for operating a position measuring system including a scale having a first track with successive partial areas of differing reflectivity and a second track with successive partial areas of differing reflectivity, and a scanning unit. The method includes moving a scanning unit relative to the scale in a measuring direction, generating a first position-dependent scanning signal and generating a second position-dependent scanning signal. The first position-dependent scanning signal and the second position-dependent scanning signal have a different pitch behavior in case of a pitch tilt of the scanning unit or the scale to the effect, that in that case the first position-dependent scanning signal indicates an erroneous position, while the second position-dependent scanning signal continues to show a correct position. Generating a third position-dependent scanning signal is generated from the first track and has a different pitch behavior than the first position measuring scanning signal generated from the first track.

It is now provided in accordance with the present invention to generate, besides the first and second generated scanning signals from the first and second track, a third scanning signal on the scale, which has a different pitch behavior than the scanning signal generated from this track. For example, the third scanning signal has a pitch behavior similar to that of the scanning signal from the respectively other track. By monitoring the scanning signals of different pitch behavior obtained from the same track, for example in a comparator unit assigned to the position measuring system, the pitch behavior of the system can be monitored, controlled, etc.

In a preferred exemplary embodiment, the position measuring system in accordance with the present invention includes a first track on the scale, which is embodied as an incremental track, as well as an absolute track arranged parallel therewith as the second track. Two incremental signal detector arrangements, as well as an absolute position signal detector arrangement, are provided on the scanning unit, which is movable in relation to the scale. First and second rough incremental signals with identical rough signal periods are generated as scanning signals with the aid of the incremental signal detector arrangements. An absolute position signal is generated by scanning the absolute track by the absolute position signal detector arrangement. The generation of the two rough incremental signals differs in that each has a different pitch behavior. This means that the scanning signals generated by different scanning beam paths have different behaviors in case of a different pitch movement, i.e.

for example a tilting of the scanning unit and the scale around an axis extending perpendicularly to the scale surface in relation to the measuring direction. Thus, one rough incremental signal is unaffected by this, while the other rough incremental signal is affected to the extent that the correct position is no longer indicated.

In case of a tilting of the scanning unit and the scale, for example around an axis extending perpendicularly to the scale surface in relation to the measuring direction, the third scanning signal generated in accordance with the present invention in the form of a second rough incremental signal shows a similar behavior as the second scanning signal i.e. the absolute position signal. The result of this is that the synchronization of these two scanning signals free of errors is possible in this case, too.

Thus, in a preferred embodiment, the position measuring system in accordance with the present invention is insensitive to twisting movement around an axis oriented perpendicularly with respect to the scale, as well as to pitch movements. The precise absolute position determination from the generated scanning signals is assured in all cases.

It has furthermore been shown to be advantageous that it is now possible to derive a measurement of the tilting of the scanning unit with respect to the scale around a pitch axis which, for example, is oriented on the scale surface perpendicularly with respect to the measuring direction, by a comparison of the two scanning signals with differing pitch behavior, i.e. of the rough incremental signals, for example, and in particular from a measurement of the phase differences. This information can be evaluated for various further purposes, for example for an exact alignment of the scanning unit during assembly.

A number of possibilities exist regarding the design of the tracks. For example, the absolute coding of the absolute track can be designed in the form of one or several reference markers, etc.

The position measuring system in accordance with the present invention can of course also be embodied as a linear, as well as a rotary position measuring system.

The principle on which the present invention is based can basically be transferred to any position measuring system in which several tracks on a scale are being scanned and wherein the scanning signals generated from different tracks show a differing behavior in case of a possible pitch inclination. It is then possible to derive two scanning signals with differing behavior from one of the tracks by appropriate scanning, or the respective design of the scanning unit, in case of such a pitch inclination. The respective phase offset between these two scanning signals then provides a measure of the actually existing pitch inclination and it can be monitored, or controlled, in the course of the measuring process.

Further advantages, as well as details, of the present invention ensue from the following description of an exemplary embodiment, making reference to the attached drawings.

An exemplary embodiment of the position measuring system will be explained in what follows by means of FIGS. 1 to 6. This is a device for absolute position determination.

BRIEF DESCRIPTION OF THE DRAWINGS

FIG. 2b shows an enlarged top view of a portion of the scale of FIG. 2a;

DETAILED DESCRIPTION OF THE PREFERRED EMBODIMENTS

Figure 1:
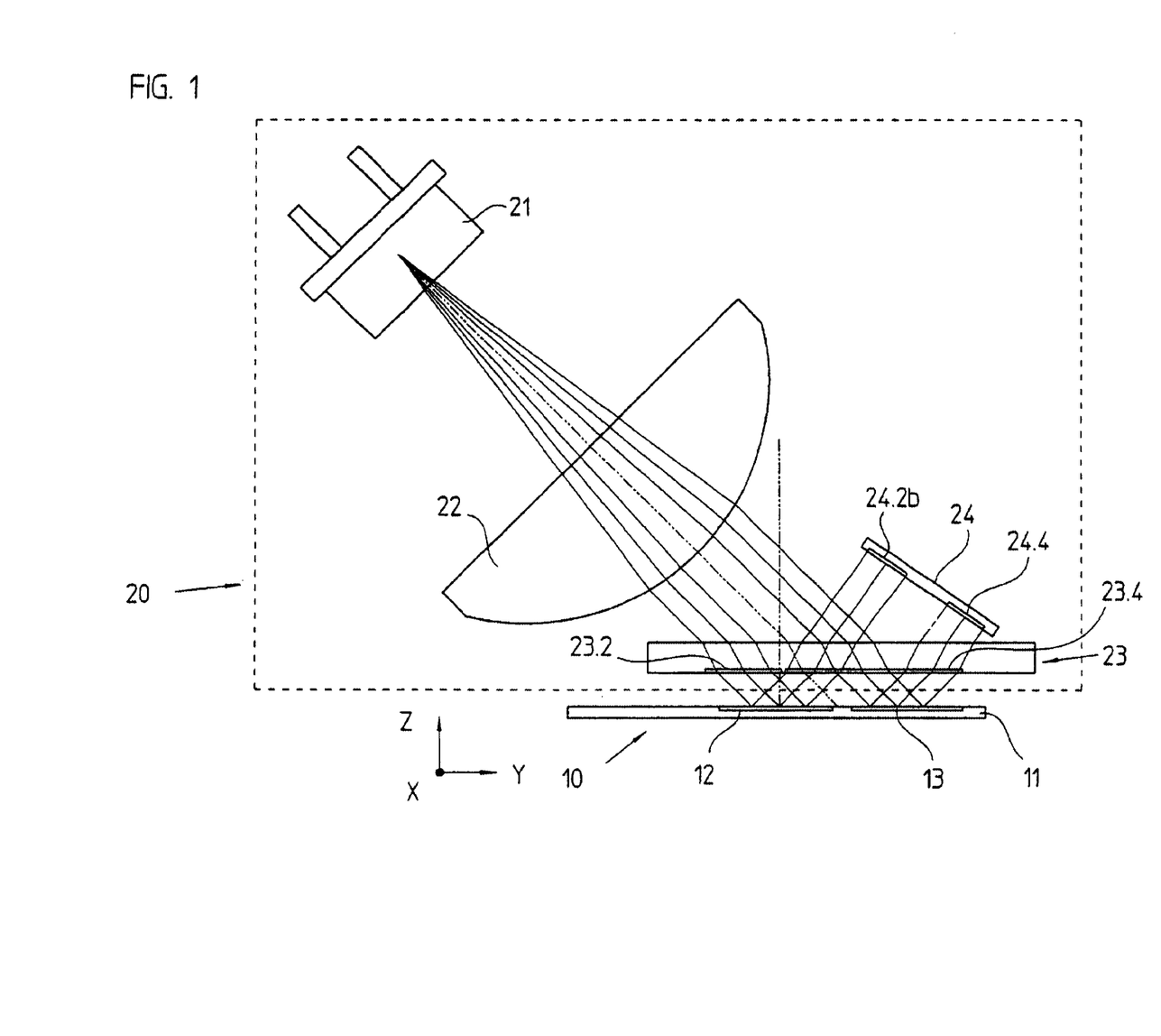
FIG. 1 is a schematic representation of the paths of the scanning beams in an exemplary embodiment of the position measuring system in accordance with the present invention.

FIG. 1 shows the basic scanning beam path in an exemplary embodiment of the position measuring system in accordance with the present invention, which is embodied as a linear incident light measuring system. The position measuring system includes a scale 10 extending in the measuring direction x, as well as a scanning unit 20, which is movable in the x direction with respect to the scale 10. In the drawing, the measuring direction x is oriented perpendicular with respect to the drawing plane. The scale 10 and the scanning unit 20 are connected with machine elements, for example, which can be moved with respect to each other and whose position with respect to each other is to be determined. Here, this can possibly be the tool and the workpiece on a numerically controlled machine tool. In this case the signals generated by the position measuring system in accordance with the present invention are further processed by a machine tool control, not represented.

In this embodiment the scale 10 of the position measuring system in accordance with the present invention includes two tracks 12, 13, which are arranged on a scale support 11 and are scanned by the scanning unit 20 for an absolute position determination. The two tracks 12, 13 extend in the measuring direction x and, in the incident light variant of the represented position measuring system, each includes a sequence of partial areas with different reflecting properties, namely of partial areas of high reflectivity and partial areas of low reflectivity.

Figure 2A:
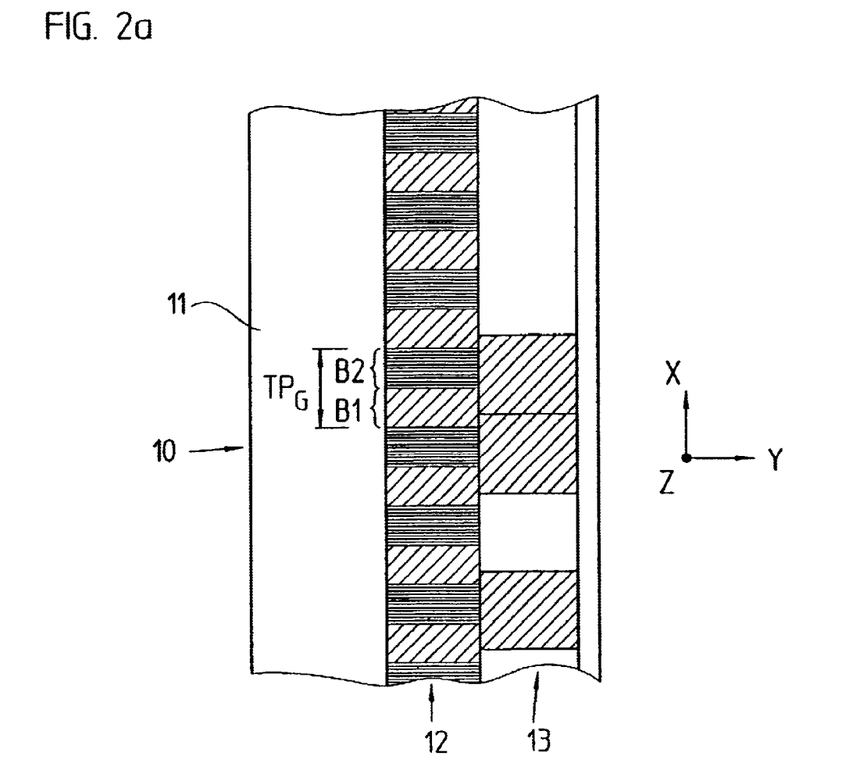
FIG. 2a shows a top view of an embodiment of a scale according to the present invention to be used with the position measuring system of FIG. 1.

The design of the two tracks 12, 13 of the exemplary embodiment represented can be seen in the view from above on the scale in FIG. 2a. In the present example, a first track 13, called the absolute track 13 hereinafter, has an absolute coding in the form of a pseudo-random code. The pseudo-random code includes an aperiodic sequence of high-reflecting and low-reflecting partial areas 13.1, 13.2, each of which has the same width in the measuring direction x. A rough absolute position signal ABS can be produced in a known manner from scanning the absolute track 13, whose resolution, however, is not yet sufficient for the desired highly precise position measurement. It is of course also possible to realize alternative serial codings of the absolute track 13, such as block codes, Manchester codes, etc. It is furthermore also possible that the absolute track has one or several reference markers as the absolute coding, which can also be used in a known manner for generating a rough absolute position signal ABS.

The second track 12, which will be called incremental track 12 hereinafter, is arranged directly adjacent and parallel with the absolute track 13. The same as the absolute track 13, the incremental track 12 also extends in the measuring direction x. The incremental track 12 is used for generating scanning signals in the form of periodic incremental signals of higher resolution $INC_F$, $INC_{G1}$, $INC_{G2}$, which are used for determining the relative positions of the scale 10 and the scanning unit 20. In detail, the three different incremental signals $INC_F$, $INC_{G1}$, $INC_{G2}$ are the fine incremental signal $INC_F$, first rough incremental signals $INC_{G1}$, as well as second rough incremental signals $INC_{G2}$. The different incremental signals $INC_F$, $INC_{G1}$, $INC_{G2}$ are combined in a suitable manner with the absolute position signals ABS from the absolute track 13 in order to determine the absolute position of the parts which can be moved with respect to each other in this way. In this case the determination of the respective absolute position from the various scanning signals can already take place in the measuring system, or later in an associated evaluating unit, for example a numeric machine tool control.

In the example shown, the incremental signals $INC_F$, $INC_{G1}$, $INC_{G2}$ are generated as the scanning signals from the scanning of the incremental track 12. The fine incremental signals $INC_F$ have the signal period $SP_F$, while the first and second rough incremental signals $INC_{G1}$, $INC_{G2}$ each have the identical signal period $SP_G$. As a rule, the signal periods $SP_F$ and $SP_G$ are clearly different from each other.

The scanned incremental track 12 has two differing graduation periods $TP_G$, $TP_F$, and in this exemplary embodiment includes a periodic sequence of first and second blocks B1, B2. The graduation period $TP_G$ is defined by the sum of the width of two successive blocks B1, B2, which represents the rougher of the two graduation periods $TP_G$, $TP_F$ in the incremental track 12. In this embodiment the widths of the blocks B1, B2 have been selected to be identical. However, the rough graduation period $TP_G$, defined by the sum of the widths, is of main importance for scanning. But, depending on the type of scanning of the incremental track 12, it is also possible to make the blocks B1, B2 of different width, if desired.

Figure 2B:
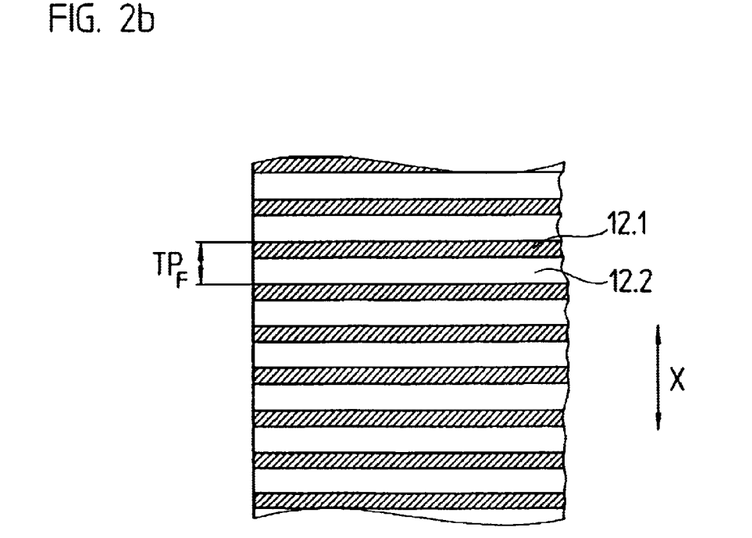
Figure 3:
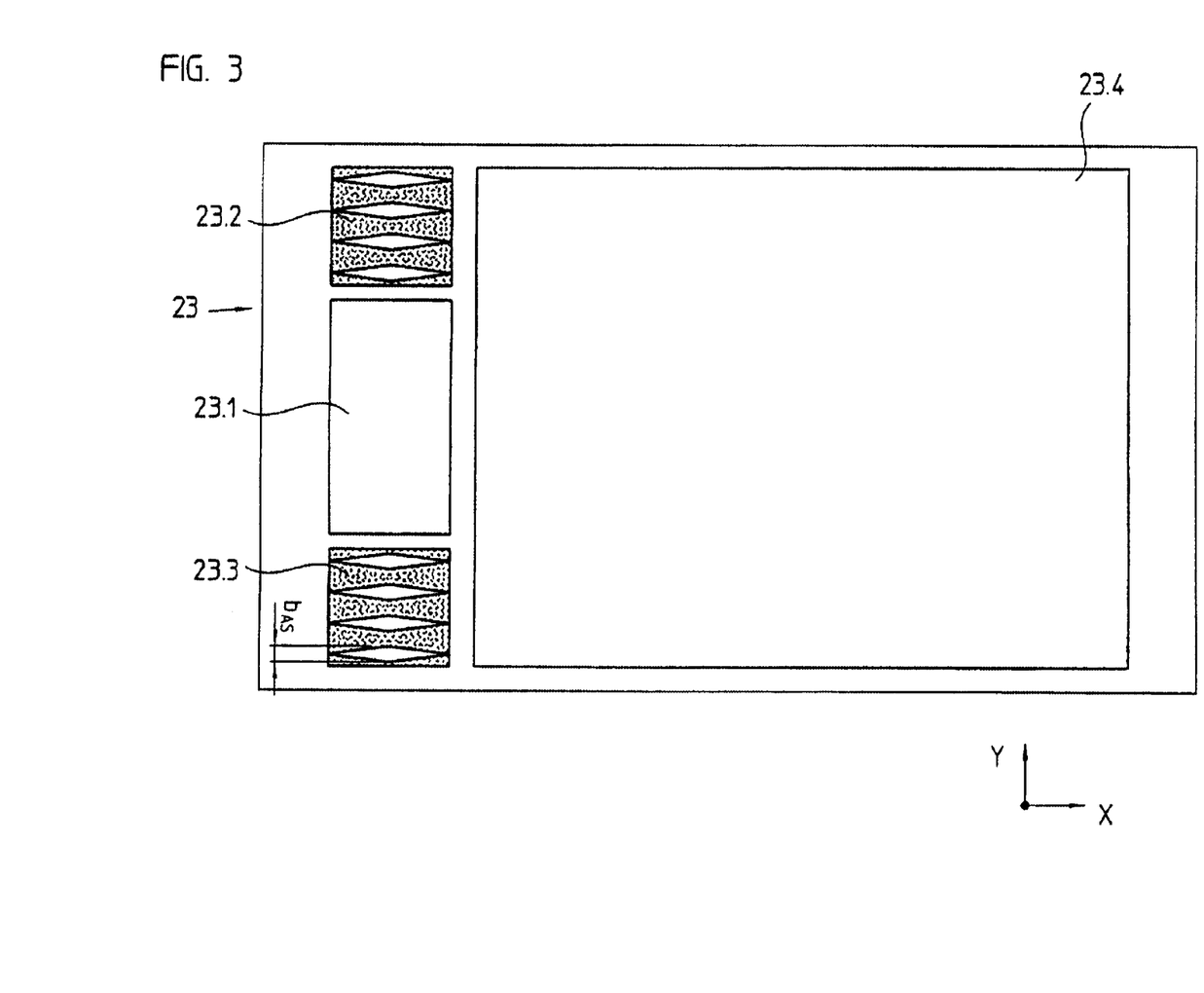
FIG. 3 is a top view of an embodiment of a scanning plate according to the present invention to be used with the position measuring system of FIG. 1.

The first blocks B1 are embodied to be of low reflection, but the second blocks B2 include a periodic sequence of further partial areas 12.1, 12.2 with low-reflecting and high-reflecting optical properties. An enlarged partial view of a second block B2 is represented in FIG. 2b. As can be seen in FIG. 2b, the partial areas 12.1, 12.2 in the second blocks B2 are designed as narrow, rectangular-shaped areas, whose longitudinal axes extend in the y direction in the scale plane, i.e. are oriented perpendicularly in relation to the measuring direction x. Each one of the different partial areas 12.1, 12.2 in the second blocks B2 has the same dimensions. The fine graduation period $TP_F$ of the incremental track 12 is defined as the sum of the width of two successive partial areas 12.1, 12.2 in the first blocks B1, which is also illustrated in FIG. 2b.

In the represented embodiment of the position measuring system in accordance with the present invention, the fine graduation period $TP_F$ of the incremental track 12 has been selected to be smaller by a factor of 8 than the rougher graduation period $TP_G$ of the incremental track 12, i.e. $TP_G=160$ μm and $TP_F=20$ μm.

In principle the rougher graduation period $TP_G$ of the incremental track 12 should be selected to be a whole number multiple of the finer graduation period $TP_F$. Only in this way is it assured that successive blocks B2 represent portions of a continuous incremental graduation of the finer graduation period $TP_F$. Accordingly, it must be assured that low-reflecting partial areas 12.1 and high-reflecting partial areas 12.2 are always alternatingly arranged over the entire length to be measured, in particular in those cases, where the incremental graduation of the finer graduation period $TP_F$ is interrupted by the low-reflecting blocks B1. Thus, a low-reflecting partial area 12.1 at the edge of a block B2 is followed by a high-reflecting partial area 12.2 in the immediately adjacent block B2, etc. However, the representation of the incremental track 12 in FIG. 2a does not show this in detail.

In this exemplary embodiment the bit width of the pseudo-random code of the absolute track 13 is moreover matched to the rougher graduation period $TP_G$. This means that the width of the partial areas 13.1, 13.2 on the absolute track 13 in the measuring direction x has been selected to be identical with the graduation period $TP_G$ of the incremental track 12.

Alternatively to the explained embodiment of the scale 10 it is of course possible to design the different partial areas of the two tracks 12, 13 on the scale support 11 with other optical properties, i.e. to interchange the high-reflecting and low-reflecting partial areas.

Moreover, it is basically also possible to provide the embodiment of the incremental track in such a way that more than three incremental signals with different signal periods can be obtained therefrom, etc.

The scanning unit 20, also represented schematically in FIG. 1, includes a light source 21, for example an LED, an optical collimating device 22, a scanning plate 23, as well as a detector unit 24 for detecting the various scanning signals.

In what follows, the scanning beam paths for generating the incremental signals $INC_F$, $INC_{G1}$, $INC_{G2}$, as well as of the absolute position signals ABS, will be explained separately.

In the example represented, after collimation by the optical collimating device 22, the beams emitted by the light source 21, which contribute to the generation of the various incremental signals $INC_F$, $INC_{G1}$, $INC_{G2}$, reach the scanning plate 23. A view of the scanning plate 23 is represented in a view from above in FIG. 3. The beams contributing to the generation of the incremental signals $INC_F$, $INC_{G1}$, $INC_{G2}$ now pass through different areas on the scanning plate 23, depending on the various incremental signals $INC_F$, $INC_{G1}$, $INC_{G2}$ to which they contribute. The different areas on the scanning plate 23 are furthermore also definitely assigned to defined areas in the detection plane, in each of which a Vernier strip system is created.

The light beams which in the end are used for generating the fine incremental signals $INC_F$ and the first rough incremental signal $INC_{G1}$ pass through the transparent window area, identified by the reference numeral 23.1, of the scanning plate 23. But the light beams used for generating the second rough incremental signals $INC_{G2}$ pass through the two areas in which respective scanning structures 23.2, 23.3 are arranged. Each of the scanning structures 23.2, 23.3 is embodied in the form of partial transparent and opaque areas arranged periodically in the measuring direction x. The transparent partial areas of the scanning structures 23.2, 23.3 are designed in an approximate rhomboid shape in the representation in FIG. 3, however, in the ideal case the transparent partial areas have sinusoidal outer contours. Regarding further measures for dimensioning the scanning structures 23.2, 23.3, reference is made to the subsequent description.

Figure 4:
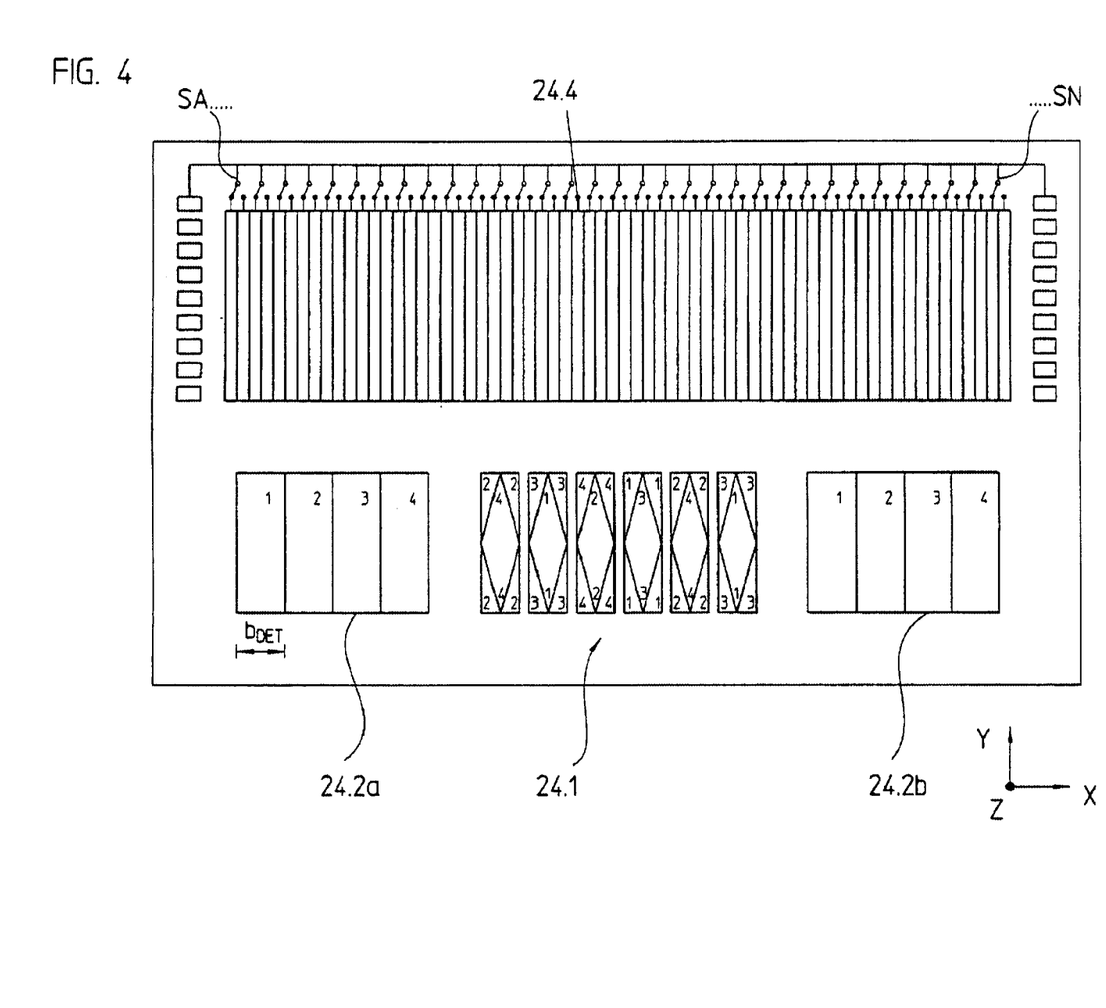
FIG. 4 is a plan view of an embodiment of a detection plane of an embodiment of a scanning unit to be used with the position measuring system of FIG. 1.

After passing through the scanning structures 23.2, 23.3, or the transparent window area 23.1, the respective beams for generating the incremental signals $INC_F$, $INC_{G1}$, $INC_{G2}$ impinge on the incremental track 12 on the scale 10 and are reflected back from there again in the direction toward the scanning plate 23. The reflected beams pass through a transparent window area 23.4 in the scanning plate 23 before impinging on the respective incremental signal detector arrangements 24.1, 24.2, 24.3 in the detector unit 23. Only one of the incremental signal detector arrangements 24.1, 24.2, 24.3 is visible in FIG. 1, therefore reference is made to the schematically represented view from above on the detection plane in FIG. 4 in relation to the definite design of the detector unit 24. As can be seen in FIG. 4, a first incremental signal detector arrangement 24.1 for generating the fine incremental signals $INC_F$ with the signal period $SP_F$, as well as for the simultaneous generation of the first rough incremental signals $INC_{G1}$ of the signal period $SP_G$, is provided in the detector unit 24. In accordance with the present invention, the scanning unit 20 moreover includes at least one second incremental signal detector arrangement 24.2, 24.3 for generating the second rough incremental signals $INC_{G2}$, which also have the signal period $SP_G$. Of course respective pairs of incremental signals are generated on the output side, which are phase-shifted by 90° with respect to each other. Regarding the detailed structure of the detector unit 24, reference is made to the detailed description of FIG. 4 which follows.

Following collimation by the optical collimation device 22, the beams which in this example are used for generating the rough absolute position signals ABS pass through the transparent window area 23.4 of the scanning plate 23 and reach the scanning track 13 on the scale 10. A reflection in the direction of the scanning plate takes place from there, where the reflected beams again pass through the transparent window area 23.4 before impinging on the absolute position signal detector arrangement 24.4 in the detector unit 24. Only an image, or a shadow projection of the respectively just detected section of the pseudo-random code on the absolute position signal detector arrangement 24.4 therefore takes place in a known manner via these paths of the beams.

A plan view of the detection plane of the detector unit 24 is represented in a schematic form in FIG. 4. Here, the absolute position signal detector arrangement 24.4, which includes a multitude of individual optoelectronic detector elements arranged successively in the measuring direction x, can be seen in the upper portion. In the exemplary embodiment represented, respectively two adjoining detector elements are used for scanning one bit of the pseudo-random code in the absolute track 13, i.e. two groups of detector elements exist, which are used for scanning the bits of the pseudo-random code. However, during measuring operations only one of the two detector elements is read out per bit, which is intended to be illustrated in FIG. 4 by the schematically indicated switching elements SA–SN above the detector elements. In the present exemplary embodiment, such a switching element SA–SN is again assigned to two detector elements, which are assigned to a bit width. In this case the selective read-out of the respective detector element takes place as a function of which of the two groups of detector elements lies closer to the center of the respective bit fields of the pseudo-random code. To decide this, the incremental signal $INC_{G1}$ with the rougher signal period $SP_G$ is used during measuring operations.

The scanning signals generated in the detector elements of the absolute position signal detector arrangement 24.4 are supplied to respective trigger elements, not represented, which provide signals with logical HIGH and LOW levels at their outputs and which are further processed for the absolute position determination. The trigger elements in integrated form are preferably also arranged on the support substrate of the detector unit 24. A reference signal is furthermore present at the trigger elements for generating the output signals, which either has a constant signal level, or is varied in a known manner as a function of the signal level of the scanning signals. The output signals of the trigger elements are supplied to a signal processing unit, also not represented, which further processes them, as well as the generated incremental signals, and generates an output signal ABS, which indicates the desired rough absolute position.

The two incremental signal detector arrangements 24.1, 24.2a, 24.2b can be seen in the lower part of the plan view of the detection plane in FIG. 4, which in this exemplary embodiment are used for scanning the incremental track and for generating the incremental signals $INC_F$, $INC_{G1}$, $INC_{G2}$ with the signal periods $SP_F$ and $SP_G$.

In detail, the first incremental signal detector arrangement 24.1 in the center is used for generating the fine incremental signals $INC_F$ and the first rough incremental signals $INC_{G1}$. Regarding the generation of these incremental signals $INC_F$, $INC_{G1}$, reference is made inter alia to the already mentioned German Patent Application 199 62 278.7, in particular to the second exemplary embodiment described there.

In the present exemplary embodiment, the second incremental signal detector arrangement 24.2a, 24.2b, which is used for generating the second rough incremental signal $INC_{G2}$, includes a total of two separate detector units 24.2a, 24.2b, which are designed as identical so-called structured detector arrangements, or detector element arrays. Within the scope of the present invention, the second incremental signal detector arrangement could in principle also have only one such detector unit.

In a known manner, the detector units 24.2a, 24.2b include a plurality of individual, rectangular-shaped optoelectronic detector elements, which are all identically embodied in a detector unit 24.2a, 24.2b and are arranged next to each other in the measuring direction x. Those detector elements of a detector unit 24.2a, 24.2b which produce equiphased scanning signals, are interconnected with each other at their respective output sides. In the embodiment represented, each detector element in the two detector units 24.2a, 24.2b is interconnected, so that at the output side a total of four partial incremental signals, offset by respectively 90°, is provided per detector unit 24.2a, 24.2b. These are differentially connected with each other in a known manner, not represented in FIG. 4, for generating two rough incremental signals $INC_{G2}$ which are phase-shifted by 90°. For the sake of simplicity, only one second rough incremental signal $INC_{G2}$ was mentioned above, and this will also be done in the course of the further description.

Periodic fringe patterns are present in the detection plane in the area of each second incremental signal detector arrangement 24.2a, 24.2b, which are the result of the interaction of the beams emitted by the light source 21 with the incremental track 12, as well as with the respectively assigned scanning structures 23.2, 23.3 of the scanning plate 23, and are used for generating the second rough incremental signals $INC_{G2}$ with the signal period $SP_G$. It should also be mentioned at this point that the transparent areas of the scanning structures 23.2, 23.3 in the scanning plate 23 have a maximum width $b_{AS}$ in the measuring direction, which is less than the width $b_{DET}$ of the associated detector elements in the structured detector arrangements of the second incremental signal detector arrangement 24.2a, 24.2b.

Accordingly, the generation of the second rough incremental signal $INC_{G2}$ in principle corresponds to the generation of an incremental signal in the first exemplary embodiment of the mentioned German Patent Application 199 62 278.7. Therefore express reference is made to the disclosure in this publication regarding details of this type of signal generation.

In particular, measures in relation to the scanning structures 23.2, 23.3, which cause the filtering of undesired signal portions at the second rough incremental signal $INC_{G2}$, should be mentioned in this connection. For such filtering it is provided in the represented example that the scanning structures 23.2, 23.3, which are embodied as amplitude gratings, are given filtering properties. Known filtering steps are employed for this and the transparent partial areas of the scanning structures 23.2, 23.3 are provided with sinusoidal openings, for example, such as is known from GB 2 116 313 A, for example. By the way, this shaping of the scanning structures 23.2, 23.3 has only been schematically indicated for graphic reasons.

Alternatively to this, the filtering of undesired harmonic portions could also be assured in a known manner by the suitable displacement of strips of the scanning structures 23.2, 23.3, etc. Within the scope of the present invention, various known measures are therefore available for filtering undesired signal portions.

By scanning of the incremental track 12, the explained design of the position measuring system in accordance with the present invention now provides a fine incremental signal $INC_F$ with the signal period $SP_F$ and the two rough incremental signals $INC_{G1}$, $INC_{G2}$ with the identical signal period $SP_G$. It is possible in a known manner to assure a high-resolution position determination by combining these signals with the rough absolute position signal ABS from the absolute track 13. In this case the various scanning signals can already be suitably calculated, or combined with each other by the device in accordance with the present invention in order to precisely determine the respective actual absolute position. But it is also possible to transmit the various scanning signals to a downstream located evaluation unit, where the determination of the absolute position by means of these signals takes place, etc.

The measures in accordance with the present invention now assure that no errors occur in the calculation, or synchronization, of the various scanning signals $INC_F$, $INC_{G1}$, $INC_{G2}$ and ABS, even in case of a pitch movement of the scanning unit in relation to the scale. In this case a pitch movement, or pitch tilt, is to be defined as a tilting of the scale and the scanning unit around an axis which is located in the scale plane, or parallel with the scale plane, and is oriented perpendicularly in relation to the measuring direction. Reference is made to FIGS. 5a to 5d and 6 for a further explanation. Here, the case of a correct alignment of the scale 10 and the scanning unit 20 is represented in FIGS. 5a to 5d on the left side in connection with the resulting two rough incremental signals $INC_{G1}$, $INC_{G2}$, as well as the absolute position signal ABS, and the case of a possible pitch tilt is illustrated on the right side.

Based on the design of the position measuring system it is assured that in case of such a pitch movement the same behavior of the fine incremental signal $INC_F$ and the first rough incremental signal $INC_{G1}$ results on the one hand and, on the other hand, in this case it is assured in accordance with the present invention that in case of a possible pitch movement the second rough incremental signal $INC_{G2}$ and the absolute position signal ABS show a similar behavior to a large extent. In case of a possible pitch movement, a phase shift $\Delta_{G1-G2}$ between the two signals $INC_{G1}$, $INC_{G2}$ results, which is a function of the pitch angle $\phi$ and into which the relatively small difference of the height of the respective detector arrangement above the scale is entered. The two scanning signals in the form of the two rough incremental signals $INC_{G1}$, $INC_{G2}$ generated from one track therefore have a different pitch behavior.

If an ideally correct alignment of the scanning unit and the scale exists, i.e. no pitch tilting in particular, the two rough incremental signals $INC_{G1}$, $INC_{G2}$ with the same signal period are equiphased. This case is illustrated on the left side of the two FIGS. 5a and 5b.

Figure 5A:
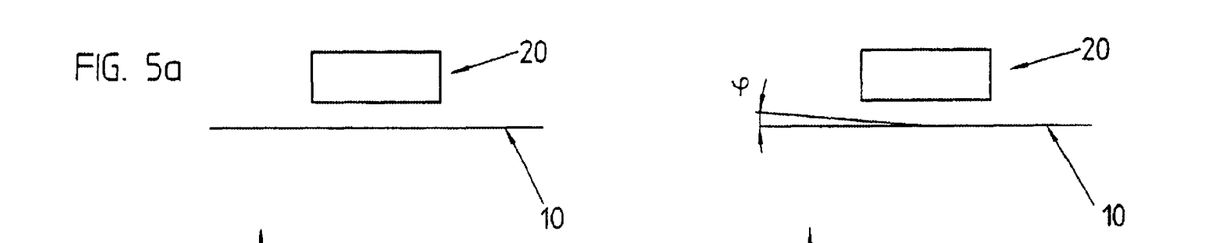
FIGS. 5a to 5d show various representations for explaining the conditions on the part of the position measuring system of FIGS. 1–4 in accordance with the present invention in case of a possible pitch movement of the scanning unit.
Figure 5B:
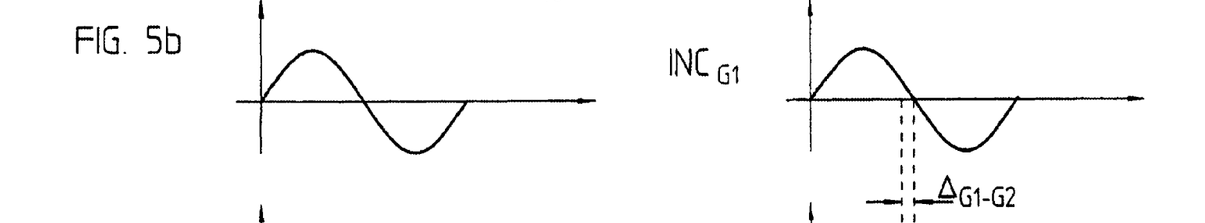
Figure 5C:
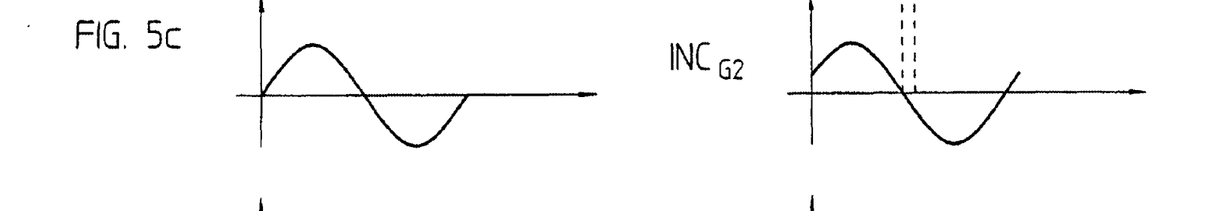

But a phase shift $\Delta_{G1-G2}$, or a phase difference between the two rough incremental signals $INC_{G1}$, $INC_{G2}$ results in case of a possible pitch movement, as can be seen in the right part of FIGS. 5b and 5c. The phase shift $\Delta_{G1-G2}$ between the two rough incremental signals $INC_{G1}$, $INC_{G2}$ is caused by the different generation, or the different scanning beam path, of the two rough incremental signals $INC_{G1}$, $INC_{G2}$. Thus, in case of the generation of the first rough incremental signal $INC_{G1}$ and with the presence of a pitch tilt, the strip pattern generated in the detection plane wanders off as a function of the pitch angle and in this way signals a presumed position change, and an error in the position determination results. In contrast thereto, when generating the second rough incremental signals $INC_{G2}$, the strip pattern resulting in the detection plane remains almost stationary on the respective detector unit, even in case of such a pitch tilt, i.e. the correct position value results even in case of such a pitch tilt.

As a result, the measured phase difference $\Delta_{G1-G2}$ between the two rough incremental signals $INC_{G1}$, $INC_{G2}$ can be detected as a measure of a possibly occurring pitch tilt between the scale and the scanning unit and can be suitably evaluated. By the way, by geometric calculations, the connection between the phase difference $\Delta_{G1-G2}$ and the pitch angle $\phi$ in the exemplary embodiment described can be cited in the form of a formula by the following equation:

$$\Delta_{G1-G2} = (2*\Phi*h_1*2\pi)/SP_G \qquad \text{Equ. (1)}$$

or $$\Phi = (\Delta_{G1-G2}*SP_G)/(2*h_1*2\pi) \qquad \text{Equ. (1')}$$

wherein $\Phi$=Pitch angle/rad $SP_G$=Rough incremental signal period $h_1$=Height of the second incremental signal arrangement above the scale.

Figure 6:
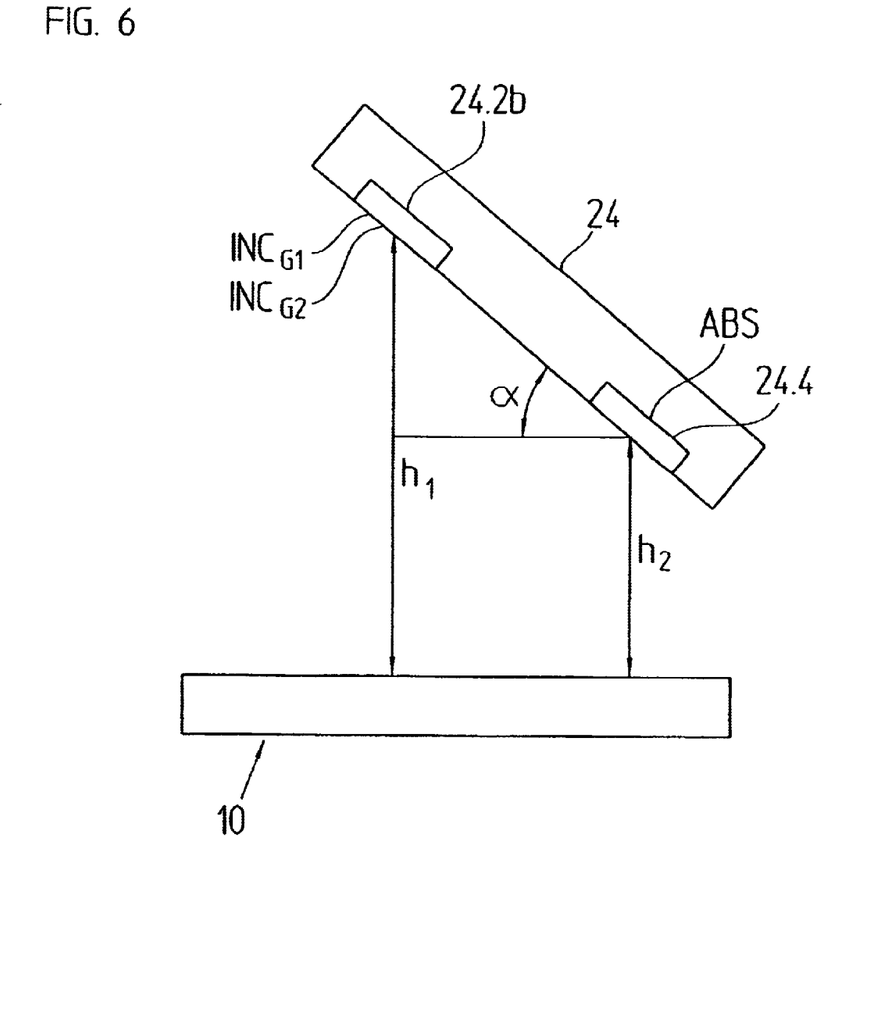
FIG. 6 is a schematic partial view of the position measuring system of FIG. 1 in accordance with the present invention for explaining various geometric values.

In regard to the meaning of the various values, reference is made to FIG. 6 for amplification, which shows a schematic partial plan view of the position measuring system in accordance with the present invention. Of course other correlations between the phase difference and the respective pitch angle occur in connection with different scanning arrangements.

A slight phase difference $\Delta_{G1-G2}$ between the second rough incremental signal $INC_{G2}$ and the absolute position signal ABS also occurs in the case of a possible pitch tilt around the pitch angle $\Phi$. This can be shown as follows:

$$\Delta_{G2-ABS} = (2*\Phi*(h_1-h_2)*2\pi)/SP_G \qquad \text{Equ. (2)}$$

In accordance with the representation in FIG. 6, the height of the absolute position signal detector arrangement 24.4 above the scale 10 is identified by $h_2$. Since, as shown, only the difference between the two values $h_1$ and $h_2$ is entered into the Equ. (2), only a slight phase difference $\Delta_{G2\text{-}ABS}$ exists.

Figure 5D:
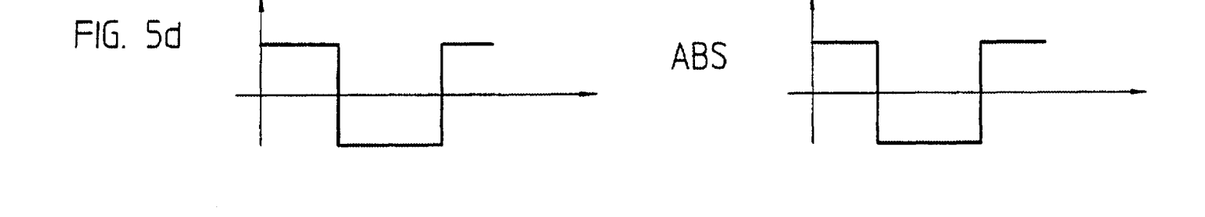

Moreover, the behavior of the absolute position signal ABS in case of a possible pitch tilt is illustrated in FIG. 5d. As can be seen therein, the absolute position signal ABS also undergoes a displacement in case of a pitch movement, which is caused by the corresponding scanning beam path, however, in this case it behaves only slightly different than the second rough incremental signal $INC_{G2}$. The relative position of the absolute position signal ABS with respect to the second rough incremental signal $INC_{G2}$ remains unchanged within defined limits, even in case of a pitch movement.

In the case of the synchronization of a rough incremental signal $INC_{G1}$ or $INC_{G2}$ and the absolute position signal ABS required for the determination of the absolute position, it is now necessary to assure that a maximally permissible phase shift between these signals is not exceeded. Only then is a correct determination of the absolute position possible. In accordance with the present invention this can now be attained in that the phase difference $\Delta_{G1\text{-}G2}$ between the two rough incremental signals $INC_{G1}$, $INC_{G2}$ with respect to a maximally permissible phase difference $\Delta_{G1\text{-}G2, max}$ is monitored. In the present example, the maximally permissible phase difference $\Delta_{G1\text{-}G2, max}$ is half a signal period of the rough incremental signal, i.e. $\Delta_{G1\text{-}G2, max} = SP_G/2$.

It is therefore possible to conclude from the continuous monitoring of the phase difference between the two rough incremental signals $INC_{G1}$, $INC_{G2}$ with different pitch sensitivities, for example during the assembly of the position measuring system, whether the maximally permissible phase shift for a correct synchronization with the absolute position signal ABS was possibly exceeded. It is assured that the correct absolute position determination is possible, even in case of an existing pitch tilt.

An appropriate monitoring and determination of the phase difference $\Delta_{G1\text{-}G2}$ can take place in a comparator unit, which is assigned to the position measuring system and by which the two scanning signals with different pitch behavior generated from a track are compared with each other for detecting a possible pitch tilt. Such a comparator unit can be arranged in the position measuring system, as well as in an evaluation unit connected downstream of the position measuring system. A correction of the spatial alignment of the scale and the scanning unit then takes place on the basis of the comparative results, if a maximally permissible pitch tilt has been exceeded. A visual and/or an acoustic warning signal is generated when a maximally permissible pitch tilt has been exceeded.

Monitoring can take place here, for example, in the course of assembly in the form of a direct visual display of the actually determined phase difference $\Delta_{G1\text{-}G2}$ on a suitable display unit. However, alternatively it can also be provided to perform this comparison continuously in an automated manner and to generate a warning signal only in case of an error, i.e. if $\Delta_{G1\text{-}G2} > \Delta_{G1\text{-}G2, max}$. In the same way this phase difference can also be monitored during actual measuring operations, and a warning signal generated in case of an error, etc.

Within the scope of the present invention, further embodiment variations of course also exist besides the explained example.

We claim:

1. A position measuring system, comprising:
    a scale comprising:
        a first track with successive partial areas of differing reflectivity; and
        a second track with successive partial areas of differing reflectivity;
    a scanning unit which moves relative to said scale in a measuring direction so that a first position dependent scanning signal and a second position dependent scanning signal are generated by scanning said first track and said second track by said scanning unit;
    wherein said first position dependent scanning signal and said second position dependent scanning signals have a different pitch behavior in case of a pitch tilt of either said scanning unit or said scale to the effect, that in that case said first position dependent scanning signal indicates an erroneous position, while said second position dependent scanning signal continues to show a correct position, and
    wherein said scanning unit has a structure such that a third position dependent scanning signal is generated from said first track and has a different pitch behavior than said first position measuring scanning signal generated from said first track.

2. The position measuring system in accordance with claim 1, wherein said third position dependent scanning signal has a pitch behavior similar to said second position dependent scanning signal from said second track.

3. The position measuring system in accordance with claim 1, further comprising a comparator unit that compares said first position dependent scanning signal and said third position dependent scanning signal for detecting a possible pitch tilt.

4. The position measuring system in accordance with claim 1, wherein said first track comprises:
    an absolute track with an absolute coding and extending in said measuring direction; and
    wherein said second track comprises an incremental track with an incremental graduation and extending parallel with said absolute track in said measuring direction; and
    wherein said scanning unit comprises:
        a first incremental signal detector arrangement arranged in a detection plane, which is suitable for generating said first position dependent scanning signal in the form of a rough incremental signal with a rough signal period; and
        an absolute incremental detector arrangement arranged in said detection plane, which is suitable for generating said second position dependent scanning signal in the form of an absolute position signal;
        a second incremental signal detector arrangement is arranged in said detection plane, which is suitable for generating said third position dependent scanning signal in the form of a second rough incremental scanning signal with said rough signal period; and
        a scanning plate comprising:
            a scanning structure assigned to said second incremental detector arrangement in a scanning beam path; and
            a transparent window area assigned in said scanning beam path to said first incremental detector arrangement, so that said rough incremental signal and said second rough incremental signal have a different pitch behavior.

5. The position measuring system in accordance with claim 4, wherein said scanning plate comprises a second transparent window area assigned to said absolute position signal detector arrangement.

6. The position measuring system in accordance with claim 4, wherein said second incremental signal detector arrangement comprises a detector unit which is arranged in said measuring direction adjoining said first incremental signal detector arrangement.

7. The position measuring system in accordance with claim 6, wherein said detector unit is designed as a structured detector arrangement comprising several rectangular-shaped detector elements, which provide partial incremental signals of different phases.

8. The position measuring system in accordance with claim 7, wherein said second incremental signal detector arrangement comprises two identically designed detector units, which are arranged in said measuring direction adjoining said first incremental signal detector arrangement.

9. The position measuring system in accordance with claim 7, wherein said scanning structure comprises periodically arranged apertures, whose maximum width in said measuring direction is less than a width of said several rectangular-shaped detector elements.

10. The position measuring system in accordance with claim 9, wherein each if said apertures has a border corresponding to the shape of a sine function.

11. The position measuring system in accordance with claim 4, wherein said incremental track comprises:
   a first incremental graduation with a rough graduation period; and
   a second incremental graduation with a fine graduation period, wherein said rough graduation period and said fine graduation period have a whole number relationship with each other.

12. The position measuring system in accordance with claim 11, wherein said first incremental signal detector arrangement is furthermore suitable for generating a fine incremental signal with a fine signal period.

13. A method for operating a position measuring system comprising a scale having a first track with successive partial areas of differing reflectivity and a second track with successive partial areas of differing reflectivity, and a scanning unit, the method comprising:
   moving a scanning unit relative to said scale in a measuring direction;
   generating a first position-dependent scanning signal;
   generating a second position-dependent scanning signal, wherein said first position-dependent scanning signal and said second position-dependent scanning signal have a different pitch behavior in case of a pitch tilt of said scanning unit or said scale to the effect, that in that case said first position-dependent scanning signal indicates an erroneous position, while said second position-dependent scanning signal continues to show a correct position; and
   generating a third position-dependent scanning signal is generated from said first track and has a different pitch behavior than said first position measuring scanning signal generated from said first track.

14. The method in accordance with claim 13, wherein said third position-dependent scanning signal has a pitch behavior similar to said second position-dependent scanning signal from said second track.

15. The method in accordance with claim 13, further comprising comparing said first position-dependent scanning signal with said third position-dependent scanning signal.

16. The method in accordance with claim 15, wherein said comparing comprises forming a phase difference from said first position-dependent scanning signal and said third position-dependent scanning signal.

17. The method in accordance with claim 16, further comprising monitoring said phase difference so that a maximally permissible phase difference is not exceeded.

18. The method in accordance with claim 17, wherein said maximally permissible phase difference equals half a signal period of said first position-dependent scanning signal.

19. The method in accordance with claim 15, further comprising correcting relative spatial alignment of said scale and said scanning unit based on said comparing when a maximally permissible pitch tilt of said scale or said scanning unit has been exceeded.

20. The method in accordance with claim 15, further comprising generating a warning signal when said comparing indicates that a maximally permissible pitch tilt has been exceeded.

* * * * *